United States Patent
Bushell et al.

(10) Patent No.: US 7,912,349 B1
(45) Date of Patent: Mar. 22, 2011

(54) VALIDATING FRAME DEPENDENCY INFORMATION

(75) Inventors: John Samuel Bushell, San Jose, CA (US); Christopher Lance Flick, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1700 days.

(21) Appl. No.: 11/113,362

(22) Filed: Apr. 25, 2005

(51) Int. Cl.
*H04N 9/80* (2006.01)
*H04N 5/92* (2006.01)
*H04N 9/82* (2006.01)
*H04N 7/12* (2006.01)
*H04N 11/02* (2006.01)
*H04N 11/04* (2006.01)
*H04N 17/00* (2006.01)
*H04N 17/02* (2006.01)

(52) U.S. Cl. ........ 386/248; 386/244; 386/245; 386/246; 386/247; 375/240.01; 375/240.12; 375/240.25; 348/180; 348/181

(58) Field of Classification Search .................. 386/68, 386/95, 125, 21, 27, 46, 47, 51, 109, 113, 386/244–248; 382/232, 236, 240; 375/240.12–240.17, 240.25–240.26, 240.01; 348/180, 181
See application file for complete search history.

(56) References Cited

U.S. PATENT DOCUMENTS

| | | | |
|---|---|---|---|
| 5,033,105 A | | 7/1991 | Atkinson |
| 5,046,119 A | | 9/1991 | Hoffert et al. |
| 5,212,742 A | | 5/1993 | Normile et al. |
| 5,237,397 A | | 8/1993 | Mighdoll et al. |
| 5,241,658 A | | 8/1993 | Masterson et al. |
| 5,267,334 A | | 11/1993 | Normille et al. |
| 5,335,299 A | | 8/1994 | Atkinson |
| 5,461,679 A | | 10/1995 | Normile et al. |
| 5,568,200 A | * | 10/1996 | Pearlstein et al. ....... 375/240.27 |
| 5,724,446 A | * | 3/1998 | Liu et al. ...................... 382/233 |
| 6,016,360 A | | 1/2000 | Nguyen et al. |
| 6,573,846 B1 | | 6/2003 | Trivedi et al. |
| 6,618,507 B1 | * | 9/2003 | Divakaran et al. ............ 382/236 |
| 6,728,315 B2 | | 4/2004 | Haskell et al. |
| 6,781,529 B1 | | 8/2004 | Lin et al. |
| 2002/0136294 A1 | | 9/2002 | Culbert |

* cited by examiner

*Primary Examiner* — Thai Tran
*Assistant Examiner* — Daquan Zhao
(74) *Attorney, Agent, or Firm* — Fish & Richardson P.C.

(57) ABSTRACT

The operation of a video playback application supporting display of an encoded video may be validated using a special-purpose video decoder. The decoder compares pre-determined indications of dependency frames for frames of the video with dependency frames that are identified based on an order in which the frames are provided to the decoder. Based on the comparison, the decoder verifies that the frames may be decoded with correct dependencies. In one implementation, a frame of a video is accessed. A first description and a second description identifying frames of the video upon which decoding of the accessed frame depends are accessed. The first description is compared to the second description, and whether the first and second descriptions identify a common set of frames is determined based on the identifying.

31 Claims, 7 Drawing Sheets

150

| sample number (152) | sync frame? (154) | partial sync frame? (156) | droppable (158) | decode duration (160) | display offset (162) | partial sync threshold (164) |
|---|---|---|---|---|---|---|
| 1 | Y | N | N | 20 | 20 | 2 |
| 2 | N | N | Y | 20 | 20 | 2 |
| 3 | N | N | Y | 20 | 20 | 2 |
| 4 | N | N | N | 20 | 20 | 2 |
| 5 | N | N | Y | 20 | 20 | 2 |
| 6 | N | N | Y | 20 | 20 | 2 |

FIG. 1A

VALIDATING FRAME DEPENDENCY INFORMATION

TECHNICAL FIELD

This document relates to video processing.

BACKGROUND

Video playback systems typically work with compressed video. Compression of a video can be done using a variety of different codes, and corresponding codecs compress the video by removing redundant information from frames of the video such that the redundant information may be reconstructed when the frames are displayed. Many codecs use I-, P-, and B-frames. An I-frame is decoded without reference to another frame, a P-frame is decoded with reference to one or more frames that are displayed before the P-frame, and a B-frame is decoded with reference to one or more frames that are displayed after the B-frame and zero or more frames that are displayed before the B-frame. In playback of an I-P-B video, the video playback system typically decodes frames in a decode order that is different from the display order, typically due to dependencies of B-frames. In other words, before a B-frame may be decoded, all frames upon which the B-frame depends are decoded. Consequently a frame that is displayed after the B-frame may be decoded before the B-frame.

When testing a video system supporting frame-reordering codecs, it can be difficult to visually identify whether the correct sequence of prediction frames was decoded. For example, errors may occur in the identification of the decode order, because the decode order differs from the display order. Such errors result in incorrect decompression of the frames of the video, because the frames are decoded based on incorrect dependencies that are indicated by the incorrect decode order. Decompression errors may be hard to detect, because an incorrectly decompressed frame may be displayed for only a short amount of time. Furthermore, the cause of the incorrect decompression may be hard to identify even if one determines that a frame was displayed incorrectly. More particularly, the incorrect dependencies for the frame, and the corresponding incorrect decode order, may be hard to identify based only on an indication that the frame has been displayed incorrectly.

SUMMARY

A disclosed video playback system plays back video that is compressed with any of a variety of different codecs. The system includes a queuing engine that determines the dependencies of frames of the video that are to be displayed, regardless of which of the supported codecs was used to encode the frames. The queuing engine uses the determined dependencies to decode frames upon which the frames to be displayed depend so that the frames can be displayed properly. The queuing engine performs its operations so as to meet the inherent timing requirements so that the video plays back at the intended display rate.

A particular disclosed validation tool automatically checks for errors in the decode order identified by the queuing engine. Rather than identifying individual frames of the video that include visible decompression errors, the validation tool identifies errors in the set of prediction frames that are indicated by the decode order. A prediction error is identified when pre-determined dependencies for a frame do not match a dependency for the frame that is indicated by the decode order. The validation tool presents an indication of the discrepancy between the pre-determined dependencies and the indicated dependencies to highlight the prediction error.

In another general aspect, a frame of a video is accessed. The decoding of the frame depends on zero or more other frames included in the video. A first description and a second description identifying frames of the video upon which decoding of the accessed frame depends are accessed. The first description is compared to the second description, and whether the first and second descriptions identify a common set of frames is determined based on the identifying.

Implementations may include one or more of the following features. For example, accessing a first description identifying frames may include identifying an order in which frames of the video should be decoded such that the other frames of the video upon which decoding of the received frame depends may be decoded before the received frame. The first description may be identified based on the identified order.

Accessing a second description identifying frames may include accessing a second description determined by another device and provided with the accessed frame. Accessing the frame may include receiving a frame of a test video for validating operation of a video playback application.

Whether the first and second descriptions identify a common set of frames may be indicated based on the determination. Indicating whether the first and second descriptions identify a common set of frames may include presenting a user interface that indicates whether the first and second descriptions identify a common set of frames.

Accessing a frame may include receiving the frame from a controller of a video playback application. Receiving the frame may include receiving the frame of the video from the controller as the controller controls decoding of the frames of the video for forward playback, reverse playback, or user-controlled stepping through the frames.

Comparing the first description to the second description further may include determining whether dependency relationships between the frames identified in the first description and the accessed frame are the same as dependency relationships between the frames identified in the second description and the accessed frame. The frames identified by the first description and the frames identified by the second description may be complete dependency sets or partial dependency sets.

Accessing a frame of a video comprises may include a frame of a video that includes frames that have been reordered. Accessing a frame of a video that includes frames that have been reordered may include accessing a frame of a video into which new frames have been inserted.

In another general aspect, a frame of a video is received. The decoding of the frame depends on zero or more other frames included in the video. A first description identifying frames of the video upon which decoding of the received frame depends is determined, and a second description identifying frames of the video upon which decoding of the received frame depends is accessed. The first description is compared to the second description, and whether the first and second descriptions identify a common set of frames is determined, based on the comparing.

In another general aspect, a sequence of frames included in a video is received. The sequence of frames indicates a type of each of the frames and an order in the sequence in which the frames may be decoded for forward playback. For each of the frames in the sequence, zero or more dependency frames upon which decoding of each frame in the sequence depends are identified. An indication of the identified dependency frames upon which decoding of each frame depends is associated with each of the frames in the sequence. The sequence of frames and the associated indication of the identified dependency frames for each frame in the sequence are provided in a configuration allowing an application to access the indication of dependency frames for any frame in the sequence.

Implementations may include one or more of the following features. For example, identifying the zero or more dependency frames may include identifying the zero or more dependency frames based on the type of the frame, types of other frames that are positioned before the frame in the sequence, and the positions of the other frames in the sequence.

The frames included in the video may be generated. The sequence may include an entire movie. The sequence may include a sequence of frames that are not decoded with correct dependencies by a video playback application.

An indication of a type of each frame, an indication of a number of frames upon which decoding of each frame depends, an indication of a position of each frame within the sequence, or an indication of a position of each frame within an order in which the frames are displayed may be associated with each of the frames. The configuration may allow an application to access, for each frame in the sequence, the indication of the type of each frame, the indication of the number of frames upon which decoding of each frame depends, the indication of the position of each frame within the sequence, or the indication of the position of each frame within the order in which the frames are displayed.

The configuration may be provided to a video playback application. Operation of the video playback application may be tested using the provided configuration.

These general and specific aspects may be implemented using a system, a method, or a computer program, or any combination of systems, methods, and computer programs.

Other features will be apparent from the description and drawings, and from the claims.

DESCRIPTION OF DRAWINGS

FIG. 1A is a block diagram of a sample table of a video.

Like reference symbols in the various drawings indicate like elements.

DETAILED DESCRIPTION

Various implementations describe a validation-only decoder that is used to validate operation of a video playback application. In contrast to a conventional video decoder, a validation-only decoder is one that, instead of decoding the encoded video content for display, determines and makes available for display information relating, for example, to the validity of an order in which the frames are to be decoded. In one implementation, the validation-only decoder validates operation of a video mentor of the video playback application. The video mentor determines an order for queuing frames of a video for decode and display such that the frames are decoded correctly and displayed with proper order and timing. The video mentor passes the order to an image compression manager, and the image compression manager queues the indicated frames in that order. The validation-only decoder validates the queuing order in which the video mentor indicates that frames should be decoded. More particularly, information describing each frame of the video indicates a sequence of prediction frames that should have been decoded before that frame, as does the decoding order identified by the video mentor. At runtime, the sequence of relevant prediction frames that have been identified by the video mentor is compared to the sequence of prediction frames indicated by the information describing the frame. The validation-only decoder clearly identifies frames that would be decoded incorrectly as a result of the frames being queued in the wrong order. In particular, a display indicating that the frames of the video have been decoded correctly or incorrectly is presented to the user. We now describe a specific implementation, and we include a description of a significant number of details to provide clarity in the description. The specific implementation involves a video playback application that uses a video mentor and an image compression manager to provide frames of a video to the validation-only decoder for validation. In this specific implementation, the validation-only decoder compares (1) a pre-determined indication of dependency frames for the frames of the video to (2) dependency frames that are identified based on an order in which frames are provided to the validation-only decoder by the video mentor and the image compression manager. However, as one of ordinary skill in the art appreciates, and as we discuss in this document after presenting the specific implementation, the validation-only decoder may be used with other video playback applications that display encoded video. The other video playback applications may not include a video mentor or an image compression manager, and may include other components for providing frames to the validation-only decoder for validation. Furthermore, the validation-only decoder may compare other indications of dependency frames to verify that the frames may be decoded with correct dependencies.

Figure 1:
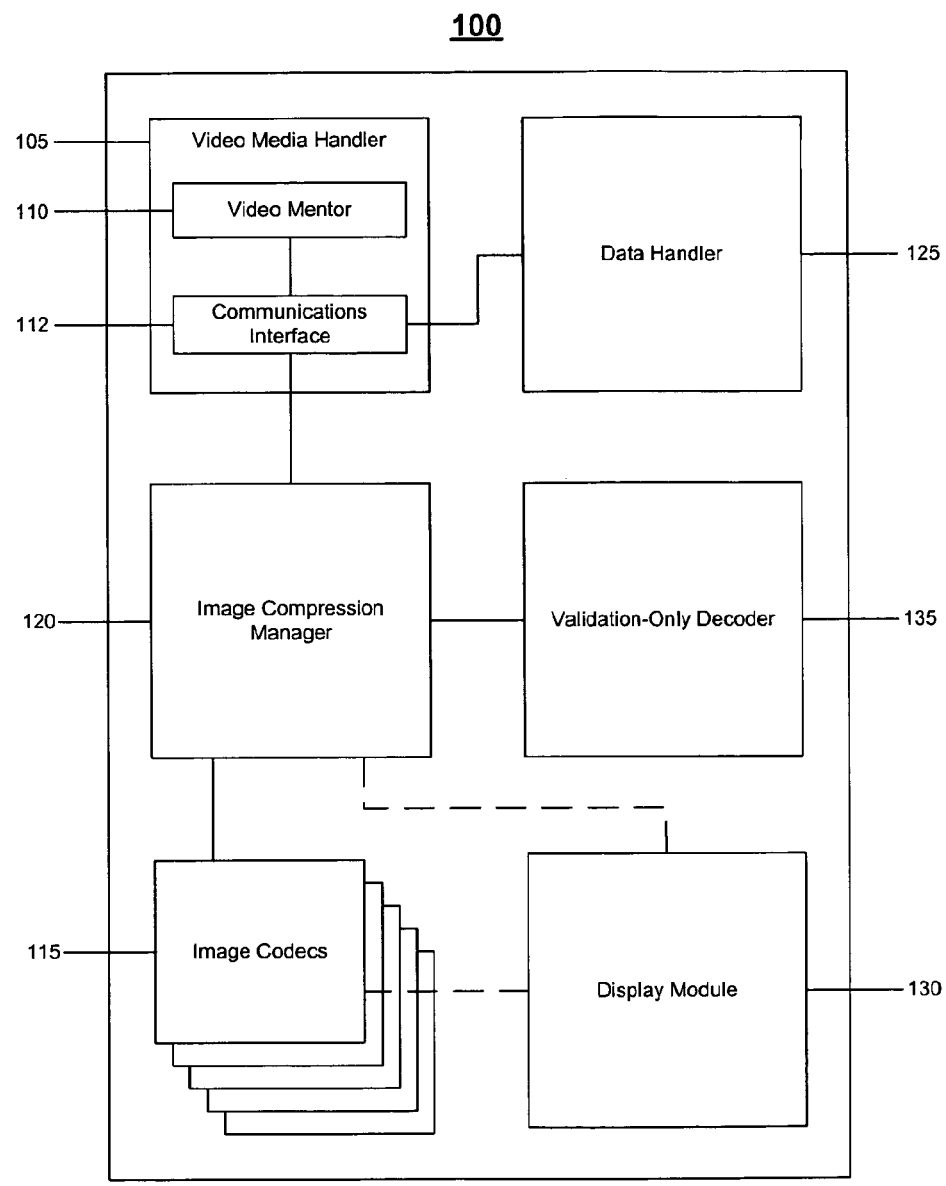
FIG. 1 is a block diagram of an application for displaying video.

Referring to FIG. 1, a video playback application 100 is used to decode and display a video that includes encoded frames. The video playback application 100 includes a video media handler 105, which includes a video mentor 110 and a communications interface 112.

The video playback application 100 also includes multiple image codecs 115 that are controlled by an image compression manager 120. The video playback application 110 also includes a data handler 125 and a display module 130.

The video media handler 105 monitors playback of a video to be displayed with the video playback application 100. The video media handler 105 oversees loading, decoding, and displaying of the video. More particularly, the video media handler 105 instructs other components of the video playback application 100 to load, decode, and display frames of the video. In addition, the video media handler 105 monitors the playback of the video using messages received from the other components of the video playback application 100.

One implementation of the video mentor 110 communicates with other components of the video playback application 100 through the communications interface 112. Based on goal information, such as playback direction, playback speed, and a look-ahead time range, the video mentor 110 guides decisions on what frames should be queued for decode and display. More particularly, the video mentor 110 identifies the frames of the video that should be decoded in order for the frames to be displayed properly. The frames that should be decoded are identified based on dependencies between the frames.

A video may include multiple sections that have each been encoded with a different codec. In typical implementations, a frame from one section does not depend on any frames from another section. The video mentor 110 is capable of playing the video through the boundaries between the sections. In other words, the video mentor 110 identifies the dependencies of the frames of each of the sections without reference to a codec that was used to encode the sections. Therefore, to the video mentor 110, the video appears to include a single section.

In addition, the video mentor 110 signals for frames to be decoded in advance of when they are to be displayed such that the frames are displayed without a perceptible delay between the frames. For example, the video mentor may signal for a particular frame and the frames upon which the particular frame depends to be decoded such that the particular frame is ready to be displayed one second in advance of when the particular frame actually is to be displayed. The video mentor 110 maintains a common model of the dynamic state of frames (see FIG. 5) based on messages that report state transitions. The states of the frames are used when identifying frames to be loaded and queued for decode or display. The model of the dynamic state of the frames is maintained across goal changes, such that, for example, if frames were decoded during playback, the frames can continue to be used during stepping.

The video mentor 110 identifies frames of a video that need to be decoded such that portions of the video may be displayed correctly to a user of the video playback application 100. The video may be displayed to the user forwards or backwards at multiple playback speeds. In addition, playback of the video may be controlled by the user. The video mentor 110 is most useful when the video is played in reverse or when the user controls playback of the video. Furthermore, the video mentor 110 is useful when playback of the video does not begin at the beginning of the video. In such cases, the video mentor 110 queues the frames that need to be decoded to enable playback of the video from a desired position in a desired direction at a desired speed.

The communications interface 112 enables the video mentor 110 to communicate with the other components of the video playback application 100. More particularly, the video mentor 110 communicates with the image compression manager 120 and the data handler 125 through the communications interface 112. In some implementations, the video media handler 105 may include multiple communications interfaces 112. For example, the video media handler 105 may include a first communications interface 112 through which the video mentor 110 may communicate with the image compression manager 120, and a second communications interface 112 through which the video mentor 110 may communicate with the data handler 125.

The image codecs 115 are tools for compressing and decompressing video. In some implementations, compressing a video may be referred to as encoding a video, and decompressing a video may be referred to as decoding a video. Each of the image codecs 115 may have a different notion of frame dependency structure. For example, the image codecs 115 may encode and decode videos using one or more of sync frames, partial sync frames, and difference frames. Each of the image codecs 115 includes a decoding tool that decompresses video. Each of the image codecs 115 also may include an encoding tool that compresses video. An encoding tool compresses the video by removing redundant information from frames of the video. In removing redundant information from a frame of the video, the encoding tool associates the frame with another frame from which the redundant information may be retrieved. The decoding tool of one of the image codecs 115 decompresses the video by recreating the redundant information that was removed by the encoding tool, based on the dependencies between the frames of the video. The image codecs 115 are used primarily to decompress video that is to be played with the video playback application 100. In typical implementations, an encoding tool that is external to the video playback application 100 is used to compress a video that is played with the video playback application 100. The image codecs 115 may include, for example, a Motion Picture Experts Group 2 (MPEG-2) codec, an MPEG-4 Advanced Video Coding (AVC)/H.264 codec, or a Cinepak codec. Typically, newer codecs, such as MPEG-4 AVC/H.264 allow more general dependency patterns between frames than older codecs, such as MPEG-2, which typically allow more limited dependency patterns.

The image compression manager 120 is an interface to the image codecs 115, and may be referred to as a codec manager. More particularly, the image compression manager 120 requests and receives an indication of frames of the video to be decoded from the video mentor 110, and the image compression manager 120 passes the frames to an appropriate one of the image codecs 115 for decoding. The image compression manager is configured to identify a codec that was used to encode each frame based on metadata that is associated with the frame. The image compression manager 120 or the appropriate one of the image codecs 115 may keep track of and buffer the frames that have been identified by the video mentor 110 for later display and decoding of other frames such that the video mentor 110 is not required to identify the frames for decode or display multiple times.

In one implementation, the image compression manager 120 also provides the decoded frames to the display module 130 for display. The image compression manager 120 may process the decoded frames further before providing the decoded frames to the display module 130. In other implementations, one of the codecs 115 that decoded the frames may provide the decoded frames to the display module 130 directly. In one implementation, the image compression manager 120 sends messages to the video mentor 110 through the communications interface 112 to notify the video mentor 110 when frames have been queued, decoded, and displayed. In another implementation, the communications interface 112 may send the video mentor 110 a message indicating that frames are about to be queued before forwarding an indication that the frames should be queued from the video mentor 110 to the image compression manager 120. In such an implementation, the image compression manager 120 still may notify the video mentor 110 when frames have been decoded or displayed. Sending messages in such a manner may prevent the video mentor 110 from receiving a message indicating that a frame has been decoded or displayed before receiving a message that the frame has been queued.

The data handler 125 loads frames of the video to be displayed into active memory. The data handler 125 requests and receives instructions to load particular frames of the video into active memory from the video media handler 105, and, more particularly, from the video mentor 110 through the communications interface 112. In response, the data handler 125 accesses a data store that includes the video, and loads the data into active memory. The data handler 125 also notifies the video media handler 105 once the frames have been loaded.

The display module 130 enables frames that have been decoded by the image compression manager 120 and the image codecs 115 to be displayed. For example, the display module 130 may provide the decoded frames to a user interface of the video playback application 100 such that the user interface may display the frames. The display module 130 may control an amount of time for which each of the frames are displayed. Alternatively or additionally, the display module 130 may display a particular frame until a later frame is to be displayed. The display module may communicate with the image compression manager 120 to inform the image compression manager 120 when a frame has been displayed.

The validation-only decoder 135 is a tool for validating that frames have been provided to the image compression manager 120 in an order that enables frames of a video to be decoded with correct dependencies. In one implementation, the validation-only decoder 135 validates operation of the video mentor 110. In other words, the validation-only decoder 135 verifies that an order in which the video mentor 110 has indicated that frames of a video should be decoded enables the video to be decoded and displayed properly. The validation-only decoder 135 may verify that the frames of the video are being decoded correctly as the frame is being played forwards or backwards, or as a user steps through the frames.

For each frame of the video, the validation only-decoder identifies one or more frames upon which the frame depends, based on the frames that have been decoded previously. The frame is provided to the validation-only decoder 135 with an indication of the frames upon which the frame depends. If the received dependencies match the locally identified dependencies, then the order in which the video mentor 110 has indicated that the frames should be decoded enables the frames to be decoded with correct dependencies. If the received dependencies do not match the locally identified dependencies, then an error has occurred, such as, for example, the video mentor 110 is not instructing the image compression manager 120 to decode the frames in an order that allows the frames to be decoded with correct dependencies. The validation-only decoder 135 may cause an indication of the conflicting dependencies to be displayed such that a source of the conflict may be identified and eliminated.

The validation-only decoder 135 also may be used to verify that frames of a movie in which the frames have been rearranged are being decoded properly. In such a case, the validation-only decoder 135 also may verify that the frames have been reordered properly. Reordering the frames of a movie may include changing the positions of the frames within the movie, or inserting new frames into a movie. When moving or inserting a frame, frames upon which the frame depends also must be moved or inserted with the frame such that those frames may be used to decode the frame. The validation-only decoder 135 verifies that the inserted or moved frame is being decoded correctly, which implicitly verifies that the frames upon which the inserted or moved frame depends have been inserted or moved correctly.

Various pairs of the components of the video playback application 100 are connected to illustrate communications between the components. For example, the video mentor 110 and the communications interface 112 are connected to indicate that the video mentor 110 and the communications interface 112 communicate. Similarly, the communications interface 112 is connected to the image compression manager 120 and the data hander 125, and the image compression manager 120 is connected to the image codecs 115. The display module 130 is connected to the image compression manager 120 in some implementations, and to the codecs 115 in other implementations. In other words, the display module 120 may receive the decoded frames to be displayed directly from one of the codecs 115, or indirectly from the image compression manager 120. In addition, the validation-only decoder 135 is connected to the image compression manager 120 in a similar manner as the image codecs 115, such that the image compression manager 120 may provide the validation-only decoder 135 with an indication of the frame decoding order that was identified by the video mentor 110.

Referring to FIG. 1A, a sample table 150 includes information describing frames included in a video. All or part of the information is used by the video mentor 110 to determine frame dependencies and queuing orders. The sample table 150 includes columns 152-164 for descriptors of the frames, and rows 176-186 for the frames. The value at a particular row and a particular column within the sample table 150 is the value of the descriptor (corresponding to the particular column) for the frame (corresponding to the particular row). More particularly, the sample table 150 indicates for each of the frames a sample number 152, and whether the frames are sync frames 154, partial sync frames 156, or droppable frames 158. The sample table 150 also indicates the decode duration 160, display offset 162, and partial sync threshold 164 of each of the frames.

The columns 154 and 156 may be used to identify a previous or next sync or partial sync frame for a particular frame. For example, a previous sync frame for a particular frame is a frame that has a sample number from the column 152 that is less than the sample number of the particular frame, and that is identified as a sync frame by the sync frame column 154. Similar identifications of a next sync frame, a previous partial sync frame, and a next partial sync frame for a particular frame may be made. In some implementations, the sample table 150 may include columns that explicitly indicate a next sync frame, a previous sync frame, a next partial sync frame, and a previous partial sync frame such that those frames do not need to be otherwise identified.

The decode time for a frame is the time at which the frame is decoded. The decode duration for a frame is an amount of time between when decoding of the frame begins and when decoding of a subsequent frame begins, which is not necessarily the amount of time needed to decode the frame. Information included in the decode duration column 160 may be used to calculate a decode time of each of the frames. For example, the decode time of the first frame in row 176 is assumed to be zero. In addition, the decode time of a particular sample is the sum of the decode duration and the decode time of an immediately previous frame. For example, the decode time the third frame in row 180 is 40, because the decode time of the second sample in row 178 is 20 (because the decode time of the first frame is 0 and the decode duration of the first frame is 20), and because the decode duration of the second sample is 20. In some implementations, the sample table 150 may include a column indicating a decode time of each of the frames, such that the decode time does not need to be calculated otherwise.

The display offset for a frame is a signed integer indicating an amount of time between when a frame is decoded and when the frame is displayed. Information included in the display offset column 162 and the decode duration column 160 may be used to identify a display time and a display duration for each of the frames. For example, the display time of a particular frame is the sum of the decode time and the display offset for the particular frame. For example, the display time of the second frame in row 180 is 40, because the decode time of the second frame is 20, and because the display offset of the second frame is 20. The display time for a frame is nonnegative, so if the display offset is negative, it must have a magnitude that is less than or equal to the decode time of the frame. In addition, the display duration of a particular frame is the difference between the display times of the particular frame and a frame that immediately follows the particular frame. For example, the display duration of the second frame is 20, because the display time of the second frame is 40 and the display time of the third frame in row 182 is 60. In some implementations, the sample table 150 may include columns indicating a display time and a display duration for each of the frames, such that the display time and the display duration do not need to be calculated otherwise.

The partial sync threshold column 164 indicates the number of partial sync samples needed for full synchronization. Consequently, the partial sync threshold column 164 indicates the frames upon which each of the frames may depend. For example, a particular frame may depend on any frames within a number of partial sync frames indicated by the partial sync threshold column 164 of the particular frame. In typical implementations, each of the frames has a default partial sync threshold of 2.

In one implementation, the sample table 150 also may include an indication of a number of frames upon which each of the described frames depends. For example, the sample table 150 may identify how many frames upon which a frame that is not a sync frame or a partial sync frame depends. By definition, sync frames and partial sync frames depend on zero frames, but other frames may depend on any number of frames. However, frames that are not sync or partial sync frames typically depend on at least one other frame. The indication of the number of frames upon which a frame depends may be used to identify the frames upon which the frame depends when decoding the frame.

Figure 2:
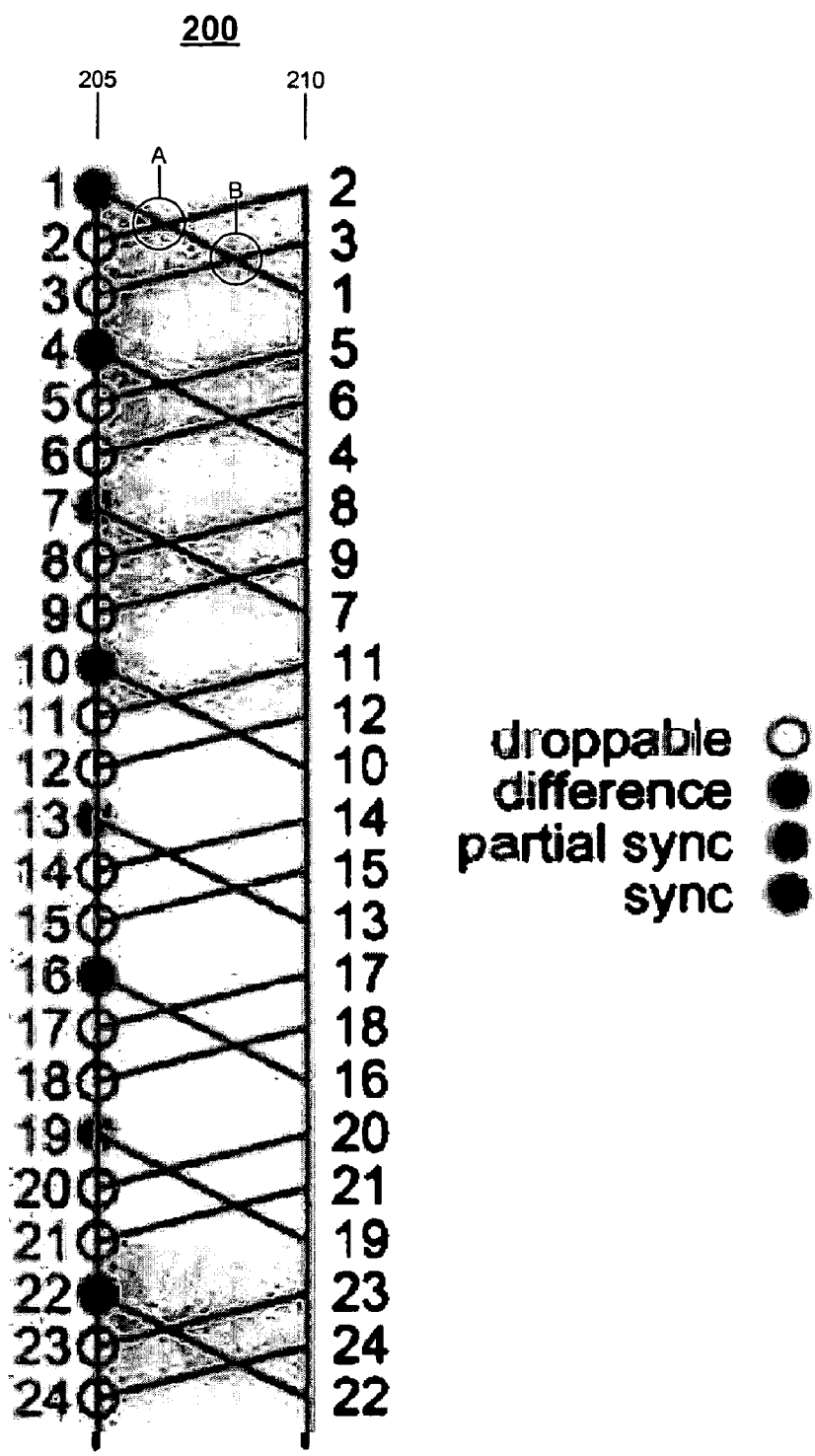
FIG. 2 is an illustration of a sequence of frames included in a video.

Referring to FIG. 2, a timeline 200 is shown for a sample video that includes 24 frames. The timeline 200 includes a decode timeline 205 and a display timeline 210. Each frame is represented with a circle along the decode timeline 205. Sample numbers for the frames are provided along the decode timeline 205. A line extends from each frame on the decode timeline 205 to the display timeline 210 to indicate the positions of the 24 frames along the display timeline 210. The numbers of the frames are included along the display timeline 210 to further indicate the position of the frames along the display timeline 210. The decode timeline 205 indicates an order in which the 24 frames are decoded, and the display timeline 210 indicates an order in which the 24 frames are displayed.

The circles representing the frames are shaded to indicate a type of each of the frames. Each of the frames may be one of four types: sync frames, partial sync frames, difference frames, and droppable frames. Sync frames and partial sync frames are examples of I-frames, which, as described earlier, are frames that may be encoded and decoded without reference to any other frames. A subsequent frame may not be decoded based solely on a partial sync frame, but may be decoded based solely on a sync frame. Frame 1 is a sync frame, and frames 7, 13, and 19 are partial sync frames.

Difference frames are encoded and decoded with reference to a previously or subsequently displayed frame. The previously displayed frame may be a sync frame, a partial sync frame, or a difference frame. P-frames and B-frames, which were described earlier, are examples of difference frames. Frames 4, 10, 16, and 22 are difference frames.

Droppable frames are a specific type of difference frame that is not used to decode other frames. Therefore, droppable frames may be dropped from the video when conserving available buffer space for frames of the video that are used to decode other frames. Frames 2, 3, 5, 6, 8, 9, 11, 12, 14, 15, 17, 18, 20, 21, 23, and 24 are droppable frames.

The sample table 150 includes information describing the first six frames of the video displayed on the decode timeline 205. The sample table 150 may be used to generate the timeline 200. In other words, the dependencies between the frames of the video are identified using the sample table 150. The dependencies may be used to identify the decode order displayed on the decode timeline 205. In addition, the display order of the frames that is displayed on the display timeline 210 may be identified from the sample table 150. The lines between the decode timeline 205 and the display timeline 210 may be generated by connecting corresponding frames between the timelines 205 and 210.

In some implementations, a video may be separated into one or more sets of frames, or groups of pictures (GOPs). For example, the video illustrated in FIG. 2 includes four GOPs. The first frame in a GOP is a sync frame or a partial sync frame, and the other frames in the GOP are difference frames or droppable frames. Therefore, a GOP is a sync or a partial sync frame and all difference and droppable frames that are to be decoded after the sync or partial sync frame and before another sync or partial sync frame. For example, frames 1-6, frames 7-12, frames 13-18, and frames 19-24 each represent a GOP. The second, third, and fourth GOPs of the video are open GOPs, which indicates that frames from an earlier GOP are used to decode frames in a current GOP. A GOP beginning with a partial sync frame indicates that the GOP is an open GOP, because later frames of the GOP may not be decoded based only on the partial sync frame. As a result, the later frames require one or more frames from a previous GOP to be decoded correctly.

In other videos, the GOPs may be closed GOPs, which indicates that decoding frames of a current GOP only uses frames from the current GOP. Videos with closed GOPs do not include partial sync frames, because frames from a current GOP do not require frames from other GOPs to be decoded. The first GOP of the video necessarily is a closed GOP, because the video does not include an earlier GOP to which the first GOP may refer.

As stated earlier, the order in which the frames are decoded is indicated by the decode timeline 205. More particularly, a first frame that appears above a second frame on the decode timeline 205 indicates that the first frame is decoded before the second frame. The decode order and the types of the frames identifies the dependencies between the frames of the video 200. A difference or a droppable frame depends on all previous non-droppable frames back to and including either a sync frame or two partial sync frames. In general, a particular difference frame or a droppable frame depends on all sync frames, partial sync frames, and difference frames between the particular difference frame or droppable frame and a most recent sync frame, including the most recent sync frame. For example, difference frame 10 depends on sync frame 1, difference frame 4, and partial sync frame 7. As another example, droppable frame 5 depends on sync frame 1 and difference frame 4.

A particular difference or droppable frame also may depend on all partial sync frames and difference frames that are within a given number of partial sync frames of the particular frame, provided a sync frame does not appear within a given number partial sync frames of the particular frame. In typical implementations, the given number is two. For example, difference frame 22 depends on partial sync frame 13, difference frame 16, and partial sync frame 19. As another example, droppable frame 17 depends on partial sync frame 7, difference frame 10, partial sync frame 13, and difference frame 16.

As an example, frames 2, 3, 1, and 5 are the first four frames of the video to be displayed. Frame 2 depends on frame 1, so frame 1 is decoded and is used to decode frame 2. Frame 2 is displayed after being decoded. Frame 3 also depends on frame 1, so frame 1, which has been decoded already, is used to decode frame 3. Frame 3 is displayed immediately after frame 2 is done being displayed, and frame 1, having been decoded already, is displayed after frame 3 is done being displayed. Frame five depends on frame 1, which has already been decoded, and on frame 4. Therefore, frame 4 is decoded and is used to decode frame 5, and frame 5 is displayed after frame 1 is done being displayed.

A particular frame may depend directly or indirectly on previously decoded frames. For example, a difference or droppable frame may depend directly on a sync, partial sync, or difference frame, and indirectly on other frames on which the difference frames depends. In one implementation, the particular frame may depend directly on a particular number of other frames, and indirectly on the frames upon which the particular number of other frames depend directly. For example, each of the frames in the video 200 may depend directly on two earlier frames in decode timeline 205. Therefore, droppable frame 8 depends directly on difference frame 4 and partial sync frame 7, and indirectly on sync frame 1 because difference frame 4 depends directly on sync frame 1. In some implementations, a difference frame may depend directly on one frame that is displayed at some point before or after the difference frame, and indirectly on other frames used to decode the one frame. Therefore, a frame may both directly and indirectly depend on a particular frame. For example, droppable frame 5 depends directly on frame 1, which is displayed before frame 5, and on frame 4, which is displayed after frame 5. However, frame 1 is used to decode frame 4, so frame 5 also depends indirectly on frame 1.

A sync frame or a partial sync frame may be decoded correctly without regard to previously decoded frames. A frame that is not a sync frame or a partial sync frame, such as a difference frame, may only be decoded correctly in its correct "temporal context," meaning following decoding of the preceding sync frames (or a number of preceding partial sync frames that is equal to the partial sync threshold) and the intermediate, non-droppable difference frames. In other words, the temporal context of a frame refers to a state of decoding of the frames of the video. The temporal context changes with each frame that is decoded, and the manner in which the temporal context changes may depend on the type of frame that is decoded. For example, when a sync frame is decoded, the temporal context is irrelevant, because the sync frame does not depend on another previously decoded frame that is indicated by the temporal context. After the sync frame is decoded, a frame following the sync frame, which may depend on the sync frame, may be decoded. Similarly, a partial sync frame may be correctly decoded without regard to the prior temporal context. After the partial sync frame is decoded, subsequent frames may be decoded, but their correctness is not ensured until a number that equals the partial sync threshold of consecutive partial sync frames, and all non-droppable frames between the consecutive partial sync frames, have been decoded. In other words, decoding a sync frame completely resets the temporal context, and decoding a partial sync frame partially resets the temporal context.

Other types of frames rely on the temporal context already being set up before the frames may be decoded. For example, difference frames, which may be classified as droppable and non-droppable, rely on the temporal context being set up when they are to be decoded. A difference frame is droppable if decoding the difference frame does not impact the temporal context. A difference frame is non-droppable if decoding the difference frame does update the temporal context, for example, by advancing the temporal context such that a subsequent frame may be decoded correctly based on the updated temporal context.

Because a frame may be decoded based on one or more frames that that are displayed after the frame, the frames of the video may not be decoded in the same order in which the frames are displayed. For example, frame 1 is decoded before frame 2 and frame 3, even though frame 1 is displayed after frame 2 and frame 3, because frame 2 and frame 3 depend on frame 1. In general lines crossing between the decode time line 205 and the display time line 210, such as at points A and B, indicate that frames have been decoded in an order that differs from the order in which the frames are displayed. If the frames were decoded in the order in which they are displayed, the frames would not be decoded correctly and, therefore would be displayed incorrectly.

Furthermore, a particular frame may depend on multiple other frames, which necessitates accessing and decoding those other frames before the particular frame may be decoded. For example, as described above, frame 17 depends on four other frames. As a result, decoding of the particular frame may need to begin a significant amount of time in advance of when the particular frame is to be displayed such that a delay between the display of a previous frame (for example, frame 13) and the display of the particular frame (for example, frame 17) is not experienced. As a result, by decoding the particular frame and the frames upon which the particular frame depends in advance of when the particular frame is to be displayed, the quality of playback of the video may increase.

The video mentor 110 may queue the frames of the video in an order that results in the frames being decoded and displayed correctly. In addition, the video mentor queues the frames for decode and display such that the frames are displayed without a perceptible delay between adjacent frames. In other words, the video mentor enables encoded videos to be displayed faithfully and correctly.

Figure 3:
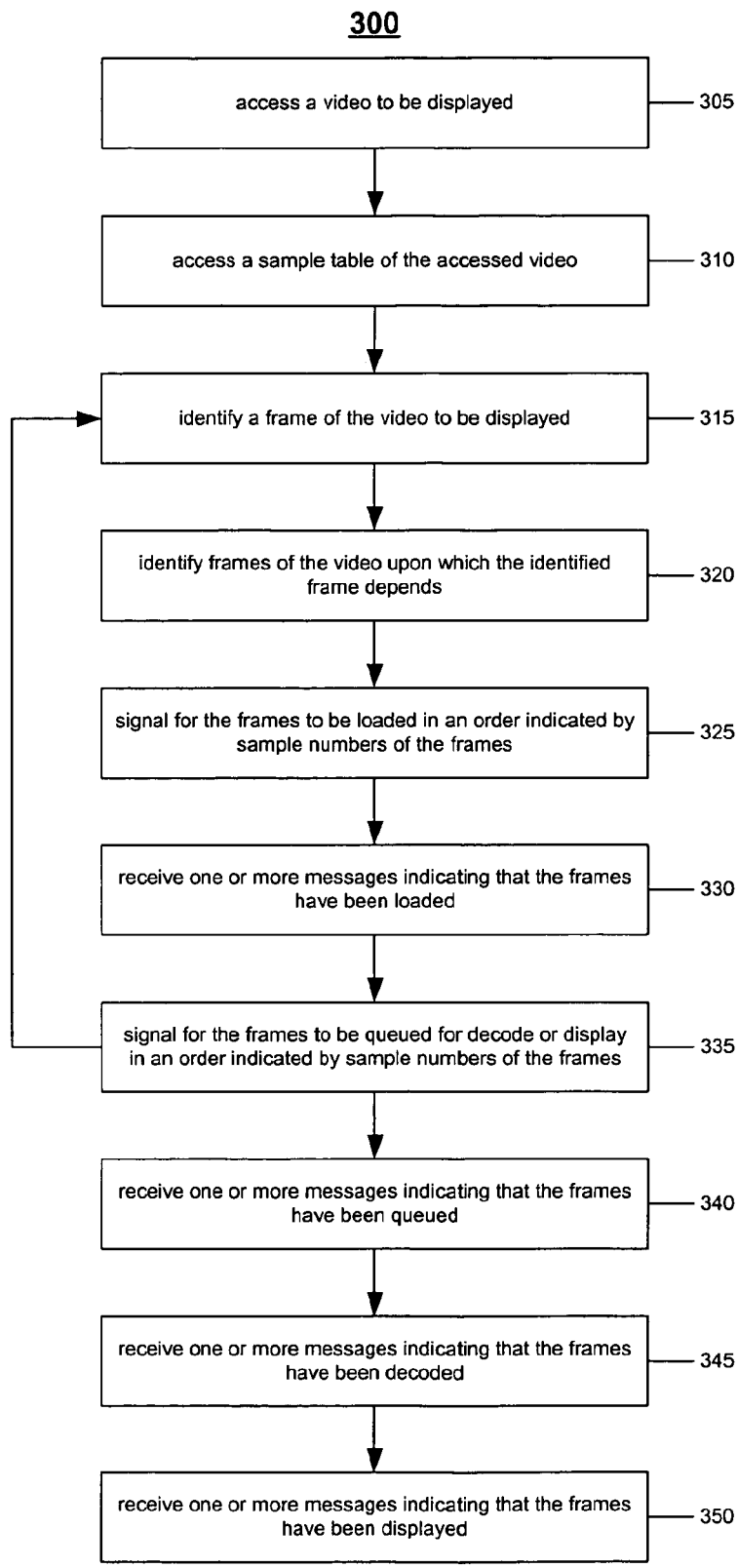
FIG. 3 is a flow chart of a process for queuing frames of a video for decode and display.

Referring to FIG. 3, a process 300 is used to control playback of a video. The process 300 is executed by the video mentor 110. The process 300 is used to queue frames of the video for decode or display in an order required for proper playback of the video. In addition, the process 300 is used to decode frames for display in advance of when the frames are to be displayed such that the frames may be displayed without a perceptible delay between the frames.

The video mentor 110 accesses a video to be displayed (305). The video may include sync frames, partial sync frames, difference frames, and droppable frames. The video mentor 110 may access the video for regular forward playback, reverse playback, or for user-controlled playback. For example, when the video is played regularly, each frame of the video may be played sequentially for a pre-defined amount of time. In some implementations, each frame of the video may be displayed for $\frac{1}{30}$ second. When a user controls playback, the user may select particular frames within the video for display. In addition, the user may step through the video by manually indicating when a subsequent frame should be displayed. When a user is controlling playback of the video, decoding the frames in advance of when the frames are to be displayed may not be possible.

The video mentor 110 also accesses a sample table of the video (310). For example, the video mentor 110 may access a sample table of the video that is similar to the sample table 150 of FIG. 1A. The sample table includes metadata describing the frames of the video. For example, the video mentor 110 may use the sample table 150 to identify whether a given frame is a sync frame 154, whether a given frame is a partial sync frame 156, or whether a given frame is a droppable frame 158. The video mentor 110 also may identify a previous or next sync or partial sync frame with the sample table 150. The decode duration 160, display offset 162, decode time, display time, and display duration of a frame also may be identified with the sample table 150. Consequently, the video mentor 110 may identify a frame that is to be displayed at a particular time with the sample table 150 by examining the display times of the frames. The video mentor 110 also may identify a partial sync threshold 164 for each of the frames.

The video mentor 110 identifies a frame of the accessed video to be displayed (315). The video mentor 110 may access an indication of a current display time of the video, and may identify a frame that is to be displayed at the current display time. The video mentor 110 typically identifies a frame that has not already been queued for decode or display, based on an internally maintained indication of what frames have been loaded, queued, decoded, and displayed. The video mentor 110 may identify the frame based on information included in the sample table 150. In addition, the video mentor 110 may identify the frame based on an indication of a most recently queued non-droppable frame, a most recently decoded non-droppable frame, a most recently displayed frame.

The frame that is identified may depend on the manner in which the video is being displayed. For example, when a user is enabled to step through the video, the frame to be displayed may be a frame at a particular position within the video that has been identified by the user. When the video is being played forwards, the video mentor identifies a frame with a lowest display time in a range extending from the current display time to a target display time, which is greater than the current display time. The video mentor attempts to prepare frames with display times between the current display time and the target display time for display such that those frames are ready to be displayed before the frames actually are displayed. Similarly, when the video is being played in reverse, then the video mentor identifies a frame with a highest display time in a range extending from the current display time to the target display time, which is less than the current display time in this case.

The video mentor 110 identifies frames of the video upon which the identified frame depends (320). The video mentor 110 may identify the frames based on one or more assumptions. For example, the video mentor may assume that the frames will be decoded correctly when decoded in an order indicated by the sample numbers of the frames. Furthermore, the video mentor 110 assumes that no frames depend on droppable frames, and that no frames depend on a frame that was decoded before a previously decoded sync sample, or before a partial sync threshold number of previous partial sync frames. In one implementation, the video mentor 110 identifies only the frames upon which the identified frame depends that have not yet been decoded. The video mentor may identify the frames using the sample table 150. In other implementations, video mentor 110 might not identify the exact dependencies of the frame to be displayed, as such dependencies may be complicated, and only need to be identified by a codec that will be used to decompress the frame to be displayed. Instead, the video mentor 110 identifies and queues the frames upon which a frame might depend on such that the frames are available to be used to decode the frame, if needed.

If the frame to be displayed is a sync frame, then the frame does not depend on any other frames. Otherwise, video mentor identifies an effective base sample and an effective sync sample for the frame to be displayed. The effective base sample may be the most recently queued non-droppable sample as indicated by an internal indication of what frames have been loaded, queued, decoded, and displayed. If a non-droppable sample has not been queued, then the effective base sample may be the most recently decoded sample, if a sample has been decoded, or a most recently displayed sample.

The effective sync sample may be the first frame upon which the frame to be displayed may depend. For example, the effective sync sample may be a previous sync frame. The effective sync sample also may be a first partial sync frame from which the frame may depend. The first partial sync frame may be a number that is equal to the partial synch threshold indicated by the sample table 150 for the frame of partial sync frames before the frame. The effective sync sample also may be the gradual decoder refresh sync point. Frames decoded after a frame at the gradual decoder refresh sync point may not depend on another frame before the gradual decoder refresh sync point. In typical implementations, the gradual decoder refresh sync point identifies a number of frames decoded before a particular frame upon which the particular frame may depend. For example, the gradual decoder refresh sync point may indicate that a particular frame may depend only on ten previously decoded frames.

If the effective base sample has a larger sample number than the effective sync sample, then some of the frames upon which the frame to be displayed depends have already been queued for decode or display. Consequently, those frames do not need to be queued again. However, if the effective sync sample has a larger sample number, then none of the frames upon which the frame to be displayed depends have been queued for decode or display. Furthermore, none of the frames upon which the frame to be displayed depends have been queued when the sample number of the effective base sample is greater than the sample number of the frame to be displayed. In such cases, all of the frames upon which the frame to be displayed depends need to be queued for decode or display.

In some implementations, rather than identifying a first frame to be displayed (315), the video mentor 110 may identify a first frame to be decoded among the frames with a display time in the range between the current display time and the target display time. However, such an identification requires identification of all of the frames upon which the frames with display times in the range, as well as the decode times of those frames. Furthermore, identifying the frames upon which the identified frame depends (320) typically identifies the first frame to be decoded, due to the structure of the dependencies between the frames. Therefore, identifying the first frame to be displayed and the frames upon which that frame depends typically is sufficient to properly decode the video.

The video mentor 110 signals for the identified frames to be loaded in an order indicated by the sample numbers of the identified frames (325). More particularly, the video mentor 110 receives a request for one or more frames to be loaded from the data handler 125, and the video mentor 110 instructs the data handler 125 to load the frames into active memory. The video mentor 110 communicates with the data handler through the communications interface 112 of the video media handler 105. The video mentor 110 receives one or more messages indicating that the frames have been loaded (330). The video mentor 110 may receive the messages from the communications interface 112, which receives the message from the data handler 125.

Once the frames have been loaded, the video mentor 110 signals for the frames to be queued for decode or display in an order indicated by the sample numbers of the identified frames (335). In one implementation, the video mentor 110 only queues the frames that have not been queued already, as indicated by an internal indication of the frames have been loaded, queued, decoded, and displayed. More particularly, the video mentor 110 receives a request for one or more frames to be queued from the image compression manager 120, and the video mentor 110 instructs the image compression manager 120 to queue the frames. The video mentor 110 communicates with the image compression manager 120 through the communications interface 112 of the video media hander 105. The image compression manager 120 queues the frames to be decoded with one of the image codecs 115. In one implementation, the video mentor queues the frames at a time that allows the frames to be decoded before the frames are to be displayed, and that allows other frames that depend on the frames to be decoded before the other frames are to be displayed.

For each frame that is to be queued, the video mentor 110 determines whether the frame is to be displayed within a range of time extending from the current display time to a final display time. For example, if the video is being played forwards, then the video mentor 110 may determine whether the frame is to be displayed between the current display time and the end of the video, or the end of a section of the video that is currently being displayed. If the user is controlling playback, then the final display time may equal the current display time such that the range has no width. The range typically includes the target display time that is used when identifying the frames to be decoded. If the frame is to be displayed within the range, then the frame is queued for decode and display. If the frame is not to be displayed within the range, then the frame is queued for decode only. If the frame is droppable, then the frame is queued for decode and display if the frame is to be displayed. Otherwise, the frame is not queued. If the frame is not droppable, then the frame is queued for decode and display, unless the frame has already been decoded but not displayed, and only if no non-droppable frames with higher sample numbers have been decoded. If the frame has been decoded but not displayed, then the frame may be queued for display only. If non-droppable frames with higher sample numbers have been decoded, then the frame might not be queued in order to prevent the frame from being decoded based on incorrect dependencies.

The video mentor 110 signals for the frames to be decoded for display in advance of when the frames are needed for display. For example, the video mentor 110 may signal for the frames to be decoded such that each frame is decoded and ready for display one second before the frame is to be displayed. Decoding a frame for display in advance of when the frame is needed eliminates a delay between when the frame should be delayed and when the frame actually is displayed that results from the frame being decoded.

After queuing the frames upon which the frame to be displayed depends, the video mentor 110 may identify a different frame to be displayed (315). In forward and backward playback, the different frame may be the next frame to be displayed in the direction of playback. If the user is controlling playback, the different frame may be another frame selected by the user for display. The frames upon which the different frame depends may be identified (320), and those frames may be loaded (325) and queued (330). In some cases, one or more of the frames upon which the different frame depends may not be loaded and queued, for example, if the frames have been loaded or queued already for another frame to be displayed. In this manner, the frames of the video are sequentially loaded and queued for decode and display such that the frames are ready to be displayed before they are needed for display. In one implementation, the video mentor 110 maintains a cache indicating the frames that have been loaded and queued for display to inform later loading and queuing operations. For example, if the video is being played forwards, then the video mentor may use information indicating that frame 5 has been identified previously for display to identify a frame that is displayed immediately after frame 5 as the next frame to be displayed. Indications of frames that have been identified for display may be cached for frames with display times between the current display time and the target display time. Caching an indication of the frames that have been loaded and queued may eliminate some processing of the video, which enables the video mentor 110 to operate more efficiently. The cached indications may be cancelled in response to, for example, a change in the direction of playback or canceling of the display of one or more frames.

The video mentor 110 receives one or more messages indicating that the frames have been queued (340). The video mentor 110 may receive the messages from the communications interface 112, which receives the message from the image compression manager 120. In addition, the video mentor 110 may receive one or more messages indicating that the frames have been decoded from the image compression manager 120 through the communications interface 112 (345). The image compression manager 120 may send such messages after the frames have been decoded with one of the codec 115. The image compression manager may access a sample table of the video, such as the sample table 150 of FIG. 1A, to identify the dependencies between the queued frames, such that the dependencies may be considered when decoding the queued frames.

The video mentor 110 also may receive one or more messages from the image compression manager 120 indicating that the decoded frames have been displayed (350). The image compression manager 120 may send such messages after passing the decoded frames to the display module 130. The image compression manager 120 also may send the messages after the image compression manager 120 receives an indication that the frames have been displayed from the display module 130. In implementations where the video is being played regularly, the frames may be displayed for predefined amounts of time. In implementations where a user is controlling display of the video, the frames may be displayed until a request to display a different frame is received from the user.

The video mentor 110 may maintain internal indications of the states of the frames in the decoding and displaying process, and the video mentor 110 may update the internal indications based on the messages exchanged with the data handler 125, the image compression manager 120, and the display module 130. In one implementation, the video mentor 110 may wait for confirmed completion of a previous request, which is indicated by an updated state for a frame for which the previous request was submitted, before submitting a subsequent request. For example, the video mentor 110 may wait for confirmation from the data handler 125 that a particular frame has been loaded before signaling for the image compression manager 120 to queue the particular frame for decode or display. As another example, when the video mentor needs to queue a first frame and a second frame, the video mentor may wait for confirmation that the first frame has been queued before signaling for the second frame to be queued. In some implementations, if confirmation of a previous request is not received within a particular amount of time, the video mentor 110 may submit the request again. As another example, the video mentor 110 may use the internal indications of the states of the frames such that, for example, the video mentor 110 does not signal for a frame to be loaded or queued multiple times after confirmed completion of a previous loading or queuing request for the frame. In one implementation, the state information informs the selection of the frames to be decoded and displayed by the video mentor 110. In another implementation, after a frame will no longer be displayed or used to decode another frame, the video mentor 110 may stop maintaining the internal indication of the state of the frame. Accordingly, in one implementation, the video mentor 110 only maintains indications of the state of frames that are, or are expected to be, queued, decoded, displayed, or used to decode other frames.

Figure 4:
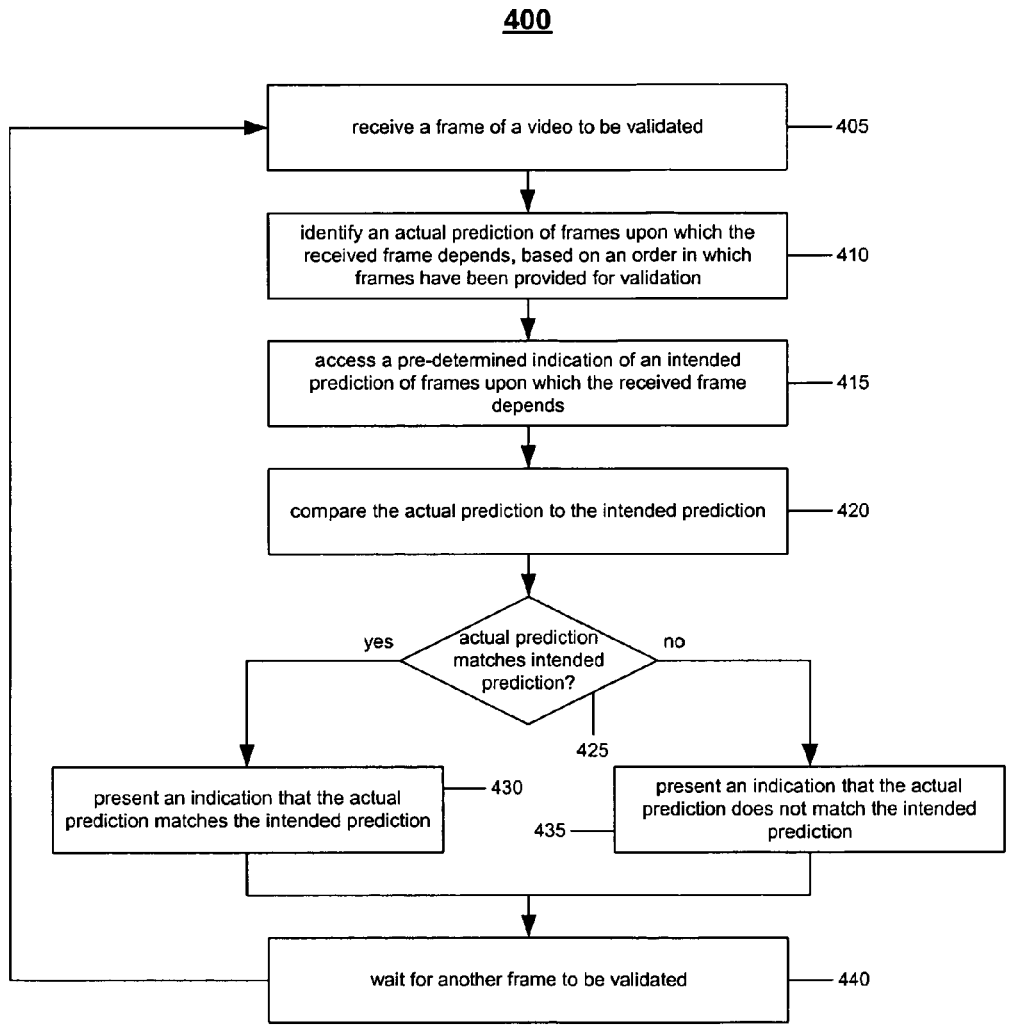
FIG. 4 is a flow chart of a process for validating an order in which frames are queued for decode and display.

Referring to FIG. 4, a process 400 is used to validate whether frames of a video are being decoded in an order that respects the dependencies between the frames. The process 400 is executed by the validation-only decoder 135 to validate operation of a video playback application 100 that includes the validation-only decoder 135. The validation-only decoder 135 identifies dependencies between the frames of the video based on an order in which the frames are provided to the validation-only decoder 135 and compares those dependencies to a pre-determined indication of dependencies that are associated with the frames. The validation-only decoder 135 may present an indication of consistent and inconsistent dependencies for one or more of the frames of the video.

The validation-only decoder 135 receives, or otherwise accesses, a frame of a video to be validated (405). In one implementation, the validation-only decoder 135 is similar to the image codecs 115, and the validation-only decoder 135 receives the frame from the image compression manager 120 as a next frame to be decoded. The image compression manager 120 identifies the validation-only decoder 135 as a codec that should be used to decode the frame based on metadata that is associated with the frame. The validation only-decoder 135 may receive the frame as a result of the video being validated as it is being played forwards or backward, or as the frames of the video are displayed out of order, for example, because a user is stepping through the video.

The validation-only decoder 135 determines the frames (referred to as an actual prediction) upon which the received frame depends, based on an order in which other frames have been provided to the validation-only decoder 135 (410). As frames are provided to the validation-only decoder 135, the validation-only decoder 135 keeps track of the last few sync, partial sync, and difference frames that have been received, and of the frames upon which the last two sync, partial sync, or difference frames depend. For example, the frames of the video may depend on a particular number of previous frames, in which case the validation-only decoder may maintain indications of at least the particular number of frames that have been received.

For example, in one implementation, the validation-only decoder 135 assumes that a difference frame may depend directly on only one other frame, and that a droppable frame may depend directly on one or two other frames. Furthermore, a droppable frame is assumed to depend on only one frame that is displayed after the droppable frame. Droppable frames that depend on one or two frames are explicitly identified as such. In such an implementation, indications of the last four frames that have been received are maintained. Such an implementation may be tailored towards videos that have been encoded with the MPEG-2 codec.

Depending on the type (e.g., sync, partial sync, difference, or droppable) of the received frame, zero, one, or two frames upon which the received frame depends directly are identified. For example, if the received frame is a difference frame, then the frame depends directly on the last sync, partial sync, or difference frame that was received. If the received frame is a droppable frame, then the frame depends directly on the last two sync, partial sync, or difference frames that were received.

In addition, the frames upon which those frames depend directly, which are frames upon which the received frame depends indirectly, are identified. Similar rules may be used to identify the frames upon which the received frame indirectly depends. For example, if the last four frames to be received are a first sync frame, a second sync frame, a difference frame, and a third sync frame, and if the received frame is a droppable frame, the received frame depends directly on the difference frame and the third sync frame. The third sync frame does not depend on another frame, but the difference frame depends directly on a frame that was received immediately before the difference frame, which is the second sync frame. Therefore, received frame depends directly on the difference frame and the third sync frame, and indirectly on the second sync frame.

Furthermore, the indications of the last sync, partial sync, and difference frames that have been received are updated. The updated indications of the last two frames may be used in relation to later frames that are to be validated The validation-only decoder 135 accesses a pre-determined indication of an intended prediction of frames upon which the received frame depends (415). For example, in one implementation, the indication of the intended prediction is associated with the frame by a video generation tool that generates the video. The video generation tool generates test videos for use with the validation-only decoder to verify that a video playback application that includes the validation-only decoder 135 is operating without error.

The video generation tool receives as an input a sequence of frames to be included in a test video and simulates decoding the frames for forward playback in the received sequence. In doing so, the video generation tool associates with each of the frames an indication of the other frames upon which the frame depends. For example, in one implementation, the video generation tool associates with each frame a string listing the other frames upon which the frame depends. In another implementation, the video generation tool stores the indications of the other frames upon which the frame depends in an external data store, such as a file or a database, that is accessible to the validation-only decoder 135. The video generation tool identifies the dependencies of each frame of the test video in a manner that is similar to how the validation-only decoder 135 identifies the dependencies of the received frame. The video generation tool also may associate with each frame indications of the type, decode number (e.g., a number indicating the position of the frame within a decode order of the video), and display number (e.g., a number indicating the position of the frame within a display order of the video). In addition, the video generation tool may associate with each frame an indication of a number of frames upon which the frame depends.

When accessing the indication of the intended prediction, the validation-only decoder 135 may access a string indicating the intended prediction that was associated with the frame by the video generation tool. As another example, the validation-only decoder 135 may access the indication of the intended prediction from a file or database in which the indication of the intended prediction has been stored by the video generation tool.

The validation-only decoder 135 compares the actual prediction to the intended prediction (420) and determines whether the actual prediction matches the intended prediction (425). More particularly, the validation-only decoder 135 determines whether the actual and intended predictions include the same frames. If the actual and intended predictions include the same frames, then validation-only decoder 135 may determine that the actual and intended predictions match.

In addition, the validation-only decoder 135 determines whether the frames included in the actual and intended predictions have common dependency relationships with the received frame. More particularly, the validation-only decoder 135 determines whether the frames included in the actual and intended predictions are directly or indirectly related to the received frame. If the dependency relationships of the frames included in the actual prediction with the received frame are consistent with the dependency relationships of the frames included in the intended prediction with the received frame, the validation-only decoder 135 may determine that the actual and intended predictions match.

If the actual prediction matches the intended prediction (425), the validation-only decoder 135 may cause an indication of the match to be presented (430). For example, the validation-only decoder 135 may cause a frame indicating the match to be presented in place of, or in addition to, the received frame. The frame may include an indication of the frames included in the actual and intended predictions, and of the dependency relationships between the frames and the received frame. The validation-only decoder 135 may generate and pass such a frame to the display module 130. The display module 130 may display the generated frame for an amount of time for which the received frame was to be displayed.

If the actual prediction does not match the intended prediction (425), the validation-only decoder 135 may cause an indication that the actual and intended predictions do not match to be presented (435). As may be done when the actual and intended predictions match, the validation-only decoder 135 may cause a frame indicating the discrepancy between actual and intended predictions to be presented in place or, or in addition to, the selected frame. The frame may highlight the discrepancy between the actual and intended predictions. For example, the frame may identify a frame that was included in the actual prediction but not the intended prediction, or vice versa. In addition, the frame may indicate dependency relationships between the frames that are different between the actual and intended predictions. The validation-only decoder 135 may generate and pass the frame to the display module 130, and the display module 130 may display the generated frame for an amount of time for which the selected frame was to be displayed.

The validation-only decoder 135 waits for another frame to be validated (440). The validation-only decoder 135 may receive another frame to be validated (405). The validation-only decoder 135 determines whether actual dependencies of the received frame that are indicated by an order in which the validation-only decoder 135 receives frames is consistent with a pre-determined indication of intended dependencies of the received frame (410-425), and causes an indication of the consistency or inconsistency to be displayed (430, 445). In this manner, the frames of the video are sequentially validated to determine if the frames may be decoded with correct dependencies. If the validation-only decoder 135 determines that the proper dependencies can be determined for every frame of the video, then the video playback application 100 that includes the validation-only decoder 135 is signaling for the frames to be queued in a proper order.

Figure 5:
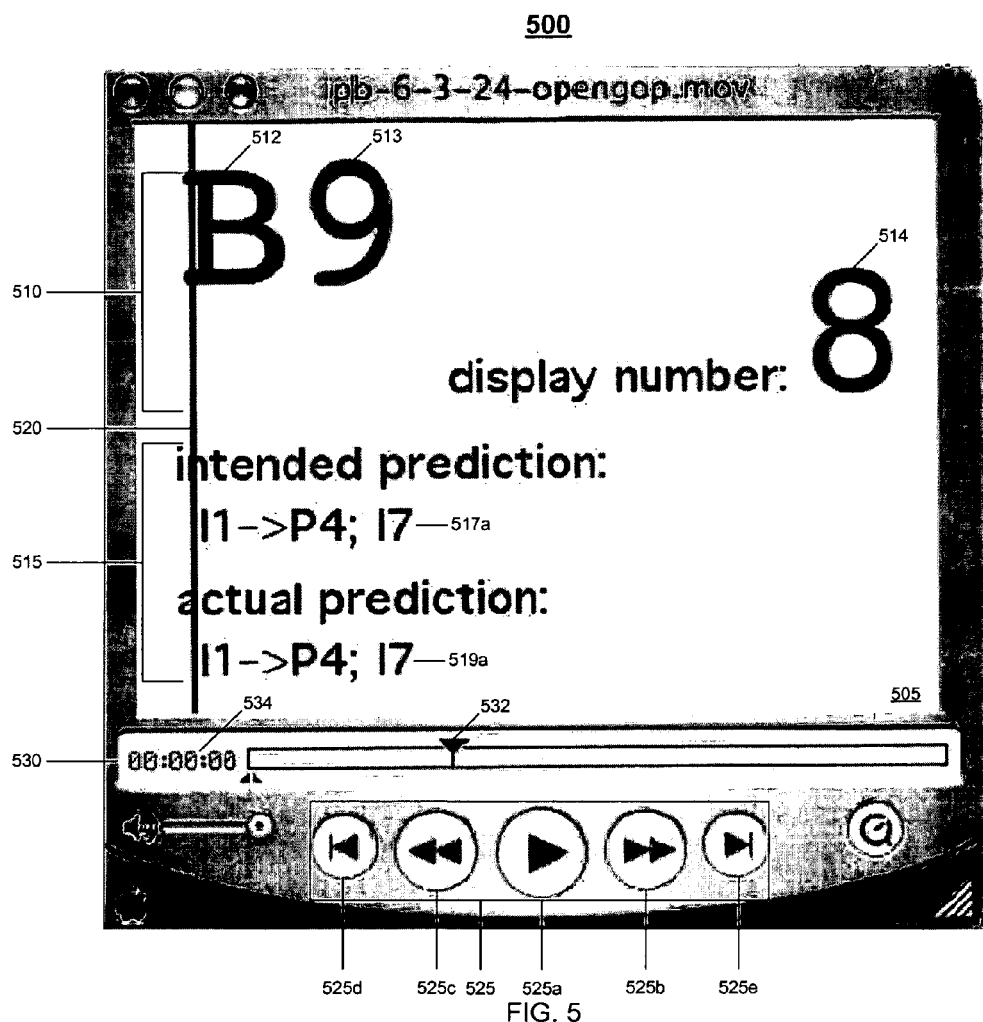
FIGS. 5 and 6 are illustrations of the user interface for validating an order in which frames are queued for decode and display.
Figure 6:
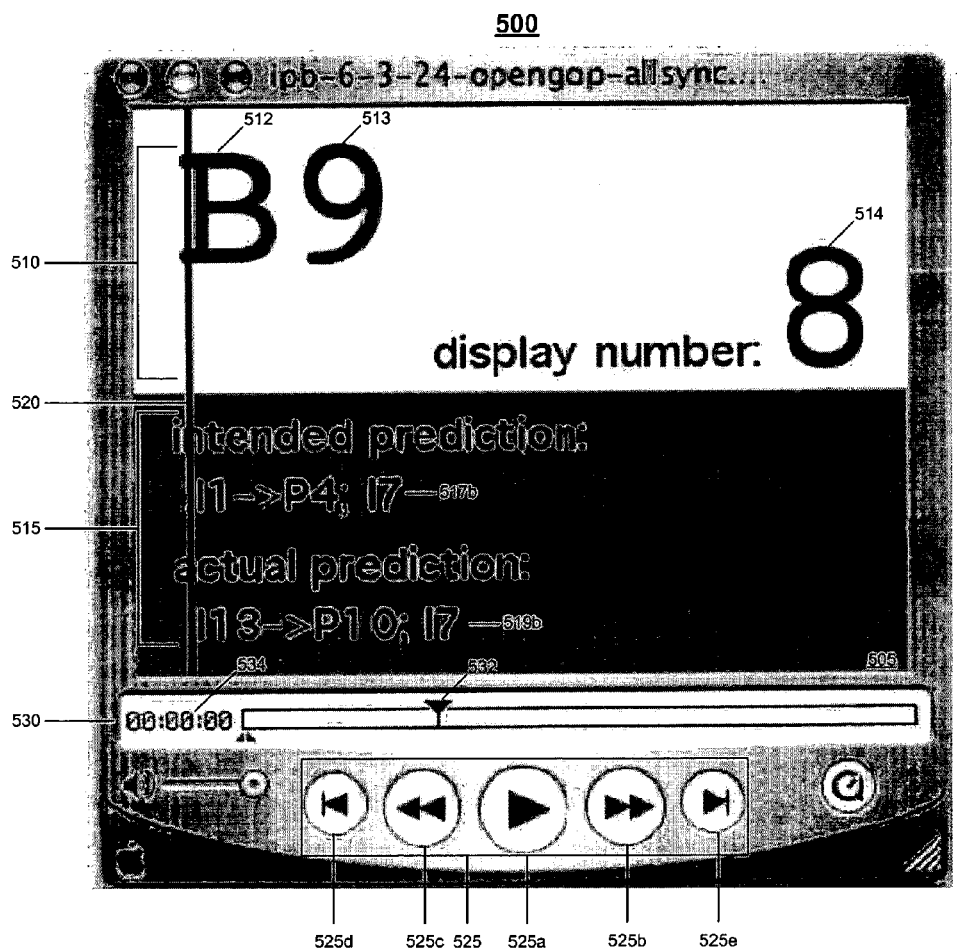

Referring to FIGS. 5 and 6, a video playback interface 500 is an interface of the video playback application 100 whose operation is validated by the validation-only decoder 135. The video playback interface 500 may be used to display frames that indicate whether frames of a video have been properly decoded for display. The frames may be generated by the validation-only decoder 135 during the process 400 of FIG. 4. The video playback interface 500 includes display area 505 in which a frame is displayed. The frame includes a frame identifier 510 that includes a frame type 512, a decode position 513, and a display position 514. The frame also includes a dependency identifier 515 that specifies intended predictions 517*a* and 517*b* and actual predictions 519*a* and 519*b*, and a status bar 520. The video playback interface 500 also includes playback control 525 that includes controls 525*a*-525*e*, and a time indicator 530 that includes a position indicator 532 and a time display 534.

The frame identifier 510 identifies the frame being validated by the validation-only decoder 135. More particularly, the frame identifier 510 indicates a type 512 of the frame, the position 513 of the frame in the decode order, and the position 514 of the frame in the display order. For example, in the illustrated implementations, the validation-only decoder 135 is validating a B-frame that is the ninth frame in the decode order and the eighth frame in the display order.

The dependency identifier 515 identifies two sets of frames upon which the frame indicated by the frame identifier 510 depends. More particularly, a first set 517*a* or 517*b* of frames that are labeled as the "intended prediction" represent a pre-determined set of intended frames upon which the frame indicated by the frame identifier 510 depends. A second set 519*a* or 519*b* of frames that are labeled as the "actual prediction" represent a set of frames upon which the frame indicated by the frame identifier 510 actually depends. In one implementation, the first set 517*a* or 517*b* is identified by a video generation tool that generates the video that includes the frame indicated by the frame identifier 510, and the second set 519*a*-519*b* is identified by the validation-only decoder 135. The dependency identifier 515 also indicates dependency relationships between the frames in each set and the frame identified by the frame identifier 510. For example, in the implementation illustrated in FIG. 5, the sets 517*a* and 519*a* both indicate that frame 9 depends on frames 1 (indirectly), 4, and 7. This dependency can be verified by inspecting the video 200, which shows that frame 7 is an I-frame, and that frame 4 is a P-frame depending on frame 1, which is an I-frame.

The status bar 520 identifies a position of the frame being validated within the video. The status bar 520 is located at the left side of the display area 505 when the first frame of the video is being validated, and at the right side of the display area 505 when the last frame of the video is being validated. The status bar 520 moves across the display area 505 as the frames of the video are validated. For example, when the frames are validated in display order, the status bar moves monotonically across the display area 505 from left to right.

The playback control 525 includes several buttons to enable a user of the video playback interface 500 to control validation of the frames of the video. More particularly, a play button 525*a* causes the frames to be validated in display order when selected. A frame indicating whether a corresponding frame from the video has been validated may be displayed for an amount of time for which the corresponding frame would have been displayed if the video were being played normally. A step forward button 525*b* and a step backward button 525*c* cause a next frame or a previous frame, respectively, to be validated. A beginning button 525*d* and an end button 525*e* may be selected to validate a first and last frame of the video, respectively. The frames indicating the correctness of the validation of the frame selected with the step forward button, the step backward button, the beginning button, or the end button may be displayed until selection of another button in the playback control 525.

The time indicator 530 identifies a position within the video of the frame being validated in a similar manner as the status bar 520. In addition, the time indicator 530 enables selection of a frame at a particular time within the video. More particularly, the position indicator 532 within the time indicator 530 may be dragged to a particular time within the video, and the frame corresponding to that point in the video is selected for validation. The time is shown in the time display 534. Validation of subsequent frames may continue from a position to which the position indicator 532 was dragged. Otherwise, the corresponding frame is displayed until another frame is selected for validation, either with the playback control 525 or the time indicator 530.

The dependency identifier 515 of FIG. 5 indicates that the set 517*a* of frames representing the intended prediction matches the set 519*a* of frames representing the actual prediction. Therefore, the frames of the video have been provided to the validation-only decoder 135 in an order that enables the frame being validated to be decoded and displayed correctly.

In contrast to FIG. 5, the dependency identifier 515 of FIG. 6 indicates that the set 517*b* of frames representing the intended prediction does not match the set 519*b* of frames representing the actual prediction, which indicates an error in the video playback application 100. More particularly, the set 517*b* indicates that the frame being validated depends directly on frames P4 and 17, and indirectly on frame I1 through frame P4. The set 519*b* indicates that the frame being validated depends directly on frames P10 and 17, and indirectly on frame I13 through frame P10. Because the sets 517*b* and 519*b* do not match, the frames of the video have not been provided to the validation-only decoder 135 in an order that enables the frame being validated to be decoded and displayed correctly. The dependency identifier 515 may be colored to clearly indicate that an error in the video mentor 110 has been detected.

In typical implementations, when validating a frame, the validation-only decoder 135 identifies all frames upon which the frame depends, which may be referred to as a complete dependency set for the frame. The validation-only decoder 135 compares all frames in the identified complete dependency set with all frames in a pre-determined complete dependency set for the frame. In other implementations, the validation-only decoder 135 may compare only some of the frames included in the identified complete dependency set to some of the frames in the pre-determined complete dependency set. In other implementations, the validation-only decoder 135 may identify only a subset of the frames upon which the frame depends, which may be referred to as a partial dependency set for the frame. For example, the validation-only decoder 135 may identify a most or least recently decoded or displayed frame upon which the frame depends. In such implementations, the validation-only decoder 135 may compare some or all of the frames in the identified partial dependency set to some or all frames included in a pre-determined partial dependency set for the frame. Identifying or comparing only a subset of the frames upon which the frame depends may simplify or streamline validation of the frame, which may lead to more efficient operation of the validation-only decoder 135.

In some implementations, rather than identifying dependencies for each frame of a video that is to be decoded, the validation-only decoder 135 may identify an order in which the frames of the video should be decoded, which indicates the decoding dependencies between the frames. The validation-only decoder 135 compares the locally identified frame decoding order to the frame decoding order provided to the image compression manager 120 by the video mentor 110. Comparing the two orders to one another implicitly compares the decoding dependencies indicated by each of the two orders for each frame in the video. If the orders are different, then the two orders may indicate different dependencies for at least one frame of the video.

To identify the order in which the frames should be decoded, the validation-only decoder 135 may access a sample table 150 of the video. As described above, the sample table 150 includes metadata describing frames of the video. For example, the sample table 150 may indicate a type of the frames and an amount of time for which the frame may be decoded or displayed.

In one implementation, the validation-only decoder 135 identifies a first order in which the frames of the video should be decoded for proper display based on information included in the accessed sample table. To do so, the validation-only decoder 135 may identify dependencies between frames of the accessed video using the sample table for the video. In one implementation, the validation-only decoder 135 may identify the dependencies of the frames that have not yet been validated. Based on the identified dependencies, the video mentor 110 identifies an order in which the frames of the video should be decoded. In one implementation, the order may include only those frames that have yet to be validated.

In addition, the validation-only decoder 135 receives an indication of a second order in which the frames should be decoded that was identified, for example, by the video mentor 110. The video mentor 110 may determine the second order in a manner similar to the way in which the validation-only decoder 135 identified the first decode order. In one implementation, the validation-only decoder 135 may receive the order directly from the video mentor 110 as the video mentor 110 provides the order to the image compression manager 135. In another implementation, the validation-only decoder 135 may receive the order from the image compression manager 135 in the form of confirmation messages that inform the video mentor 110 that the frames have been queued for decode or display in the order specified by the video mentor 110.

The validation-only decoder 135 selects a frame of the video to be displayed for validation. For example, the validation-only decoder 135 may select the first frame of the video to be displayed. The validation-only decoder 135 then identifies an intended prediction of the frames upon which the selected frame depends. In addition, the validation-only decoder 135 identifies an actual prediction of the frames upon which the selected frame depends. The intended prediction and the actual prediction may be identified based on the first order and the second order, respectively, in a manner that was described with respect to FIG. 2. The actual and intended predictions may be compared, and frames indicating results of the comparison may be displayed, as was described with respect to FIG. 4. In this manner, actual and intended predictions may be calculated for each frame included in the first and second orders.

In some implementations, a movie may include multiple smaller movies, each of which is identifiable by a unique name. In one such case, each of the smaller movies has an independent set of identifiers for the frames included in the smaller movie, and the independent sets may overlap such that frames from different ones of the smaller movies have the same identifiers. In addition to indications of the type, decode number, display number, and dependencies that are associated with each of the frames, an indication of the name of the smaller movie that includes the frame may be associated with the frame to uniquely identify the frame within the movie. Consequently, the validation-only decoder 135 also may verify that the name of the smaller movie that is associated with the frame matches the name of the smaller movie whose frames are being validated. If the names do not match, then the video playback application 100 may not be operating correctly, because decoding of the frame may be based on frames of another one of the smaller movies, which typically is not allowed. However, the names may not need to match, for example, for sync frames to be decoded correctly, because sync frames do not have any dependencies.

The validation-only decoder 135 has been primarily described throughout as validating operation of a video playback application 100 that uses a video mentor 110 and an image compression manager 120 to provide frames of a video to the validation-only decoder for validation. In this specific implementation, the validation-only decoder compares a predetermined indication of dependency frames for the frames of the video to dependency frames that are identified based on an order in which frames are provided to the validation-only decoder by the video mentor and the image compression manager. However, the validation-only decoder 135 need not be used only in the context of a video playback application 100 that includes a video mentor 110 and an image compression manager 120. In other implementations, the validation-only decoder 135 may be used with more generic video playback applications supporting display of videos including frames that may be decoded and displayed in different orders. For example, the validation-only decoder 135 may operate as a standard decoder within a generic video playback application. In one such implementation, the generic video playback application includes other components for providing frames to the validation-only decoder 135 for validation, and the validation-only decoder 135 verifies that the generic video playback application enables the provided frames to be decoded and displayed properly.

To do so, the validation only-decoder 135 may compare two or more indications of dependency frames for a frame, and may determine that the frame may be decoded and displayed correctly if the indications of the dependency frames are consistent with one another. For example, the indications may be received with the frame, accessed from a database that includes an indication of the dependency frames, read from a file that includes an indication of the dependency frames, or accessed from a web server that is configured to provide an indication of the dependency frames in response to a request. In addition, an indication of the dependency frames may be identified by the validation-only decoder 135 using an algorithm that is similar to or different from the algorithm described above with respect to FIG. 4. Further, the term "validation-only decoder" is not intended to be restrictive, because element 135 may, in various implementations, perform, for example, only a determination of dependency information, only a comparison of two sets of dependency information, one or more of a variety of other operations, or a combination of operations.

The validation-only decoder 135 may be used in a variety of applications. For example, the validation-only decoder 135 may be used as a developer tool that enables developers to debug video playback applications or codecs during development. The validation-only decoder 135 also may be used by content providers to verify that content will be displayed correctly by a video playback application. In one such case, the content providers may generate test videos that are similar in structure to the content to be provided. If the validation-only decoder 135 validates the test videos, then the content provider may have a level of confidence that the video playback application will correctly display the content.

The described systems, methods, and techniques may be implemented in digital electronic circuitry, computer hardware, firmware, software, or in combinations of these elements. Apparatus embodying these techniques may include appropriate input and output devices, a computer processor, and a computer program product or other sequences of instructions tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method comprising:
   accessing a frame of a video, the accessed frame to be decoded based on zero or more other frames included in the video;
   accessing an intended prediction identifying the zero or more frames of the video upon which decoding of the accessed frame is based;
   accessing an actual prediction identifying the zero or more frames of the video upon which decoding of the accessed frame is based;

comparing, by a decoder implemented using a processor, the intended prediction with the actual prediction;

establishing, based on the comparing, whether the intended prediction matches the actual prediction; and determining by the decoder, based on the establishing, whether the intended and actual predictions identify a common set of frames;

wherein the intended prediction identifying zero or more frames of the video comprises a predetermined sequence of dependency frames indicated by information associated with the accessed frame and the actual prediction identifying zero or more frames of the video comprises a queuing order of frames corresponding to the accessed frame.

2. The method of claim 1 wherein accessing an intended prediction identifying frames comprises:

identifying an order in which frames of the video should be decoded such that the other frames of the video upon which decoding of the accessed frame is based may be decoded before the accessed frame, and identifying the intended prediction based on the identified order.

3. The method of claim 1 wherein accessing an actual prediction identifying frames comprises accessing an actual prediction of frames determined by another device and provided with the accessed frame.

4. The method of claim 1 wherein accessing the frame comprises receiving a frame of a test video for validating operation of a video playback application.

5. The method of claim 1 further comprising indicating, based on the determination, whether the intended and actual predictions identify a common set of frames.

6. The method of claim 5 wherein indicating whether the intended and actual predictions identify a common set of frames comprises presenting a user interface that indicates whether the intended and actual predictions identify a common set of frames.

7. The method of claim 1 wherein accessing a frame comprises receiving the frame from a controller of a video playback application.

8. The method of claim 7 wherein receiving the frame comprises receiving the frame of the video from the controller as the controller controls decoding of the frames of the video for forward playback, reverse playback, or user-controlled stepping through the frames.

9. The method of claim 1 wherein comparing the intended prediction with the actual prediction further comprises determining whether dependency relationships between the frames identified in the intended prediction and the accessed frame are the same as dependency relationships between the frames identified in the actual prediction and the accessed frame.

10. The method of claim 1 wherein accessing a frame of a video comprises accessing a frame of a video that includes frames that have been reordered.

11. The method of claim 10 wherein accessing a frame of a video that includes frames that have been reordered comprises accessing a frame of a video into which new frames have been inserted.

12. The method of claim 1 wherein the frames identified by the intended prediction and the frames identified by the actual prediction are complete dependency sets.

13. The method of claim 1 wherein the frames identified by the intended prediction and the frames identified by the actual prediction are partial dependency sets.

14. A non-transitory machine-readable storage medium tangibly embodying a computer program comprising instructions that, when executed by a processing apparatus, cause the processing apparatus to perform operations comprising:

receiving a frame of a video, the received frame to be decoded based on zero or more other frames included in the video;

determining an intended prediction identifying zero or more frames of the video upon which decoding of the received frame is based;

accessing an actual prediction identifying zero or more frames of the video upon which decoding of the received frame is based;

comparing the intended prediction with the actual prediction;

establishing, based on the comparing, whether the intended prediction matches the actual prediction; and determining, based on the establishing, whether the intended and actual predictions identify a common set of frames;

wherein the intended prediction identifying zero or more frames of the video comprises a predetermined sequence of dependency frames indicated by information associated with the received frame and the actual prediction identifying zero or more frames of the video comprises a queuing order of frames corresponding to the received frame.

15. The non-transitory machine-readable storage medium of claim 14 wherein determining an intended prediction identifying frames comprises:

identifying an order in which frames of the video should be decoded such that the other frames of the video upon which decoding of the received frame is based may be decoded before the received frame, and identifying the intended prediction based on the identified order.

16. The non-transitory machine-readable storage medium of claim 14 wherein accessing an actual prediction identifying frames comprises accessing an actual prediction of frames determined by another device and provided with received frame.

17. The non-transitory machine-readable storage medium of claim 14 wherein receiving the frame comprises receiving a frame of a test video for validating operation of a video playback application.

18. The non-transitory machine-readable storage medium of claim 14 further comprising instructions that, when executed by a processing apparatus, cause the processing apparatus to perform operations comprising:

indicating, based on the determination, whether the intended and actual prediction identify a common set of frames.

19. The non-transitory machine-readable storage medium of claim 18 wherein indicating whether the intended and actual predictions identify a common set of frames comprises presenting a user interface that indicate whether the intended and actual predictions identify a common set of frames.

20. The non-transitory machine-readable storage medium of claim 14 wherein receiving a frame comprises receiving the frame from a controller of a video playback application.

21. The non-transitory machine-readable storage medium of claim 20 wherein receiving the frame comprises receiving the frame of the video from the controller as the controller controls decoding of the frames of the video for forward playback, reverse playback, or user-controlled stepping through the frames.

22. The non-transitory machine-readable storage medium of claim 14 wherein comparing the intended prediction to the actual prediction further comprises determining whether dependency relationships between the frames identified in the intended prediction and the received frame are the same as dependency relationships between the frames identified in the actual prediction and the received frame.

23. The non-transitory machine-readable storage medium of claim 14 wherein receiving a frame of a video comprises accessing a frame of a video that includes frames that have been reordered.

24. The non-transitory machine-readable storage medium of claim 23 wherein accessing a frame of a video that includes frames that have been reordered comprises accessing a frame of a video into which new frames have been inserted.

25. The non-transitory machine-readable storage medium of claim 14 wherein the frame identified by the intended prediction and the frame identified by the actual prediction are complete dependency sets.

26. The non-transitory machine-readable storage medium of claim 14 wherein the frames identified by the first intended prediction and the frames identified by the actual prediction are partial dependency sets.

27. A system comprising:
a data store including a video comprising a plurality of frames, each frame to be decoded based on zero or more other frames included in the video; and
a decoder implemented using a processor and configured to:
  access a frame of the plurality of frames,
  access an intended prediction identifying frames of the video upon which decoding of the accessed frame is based,
  receive an actual prediction identifying frames of the video upon which decoding of the accessed frame is based,
  compare the intended prediction with the actual prediction,
  determine, based on the comparing, whether the intended prediction matches the actual prediction, and
  ascertain, based on the determining, whether the intended and actual predictions identify a common set of frames.

28. The system of claim 27 further comprising
a video media handler that is configured to
  identify an order in which frames of the video should be decoded such that the other frames of the video upon which decoding of the accessed frame is based may be decoded before the received frame,
  identify the intended prediction based on the identified order, and
  provide the actual prediction to the decoder.

29. The system of claim 27 further comprising
a display on which an indication of whether the intended first and actual predictions identify a common set of frames is displayed.

30. A system comprising:
means for receiving a frame of a video, the received frame to be decoded based on zero or more other frames included in the video;
means for receiving an intended prediction identifying zero or more frames of the video upon which decoding of the received frame is based;
means for receiving an actual prediction identifying zero or more frames of the video upon which decoding of the received frame is based; and
a decoder, implemented using a processor, for evaluating whether the intended prediction matches the actual prediction, the decoder being configured to determine, based on the evaluating, whether the intended and actual predictions identify a common set of frames;
wherein the intended prediction identifying zero or more frames of the video comprises a predetermined sequence of dependency frames indicated by information associated with the received frame and the actual prediction identifying zero or more frames of the video comprises a queuing order of frames corresponding to the received frame.

31. A system comprising:
a storage device, tangibly storing a video comprising a plurality of frames; and
a computer processor configured to perform operations comprising:
  accessing a frame of the video, the accessed frame to be decoded based on zero or more other frames included in the video;
  accessing an intended prediction identifying zero or more frames of the video upon which decoding of the accessed frame is based;
  accessing an actual prediction identifying zero or more frames of the video upon which decoding of the accessed frame is based;
comparing, by a decoder implemented using a processor, the intended prediction with the actual prediction;
establishing, based on the comparing, whether the intended prediction matches the actual prediction; and
determining by the decoder, based on the establishing, whether the intended and actual predictions identify a common set of frames;
wherein the intended prediction identifying zero or more frames of the video comprises a predetermined sequence of dependency frames indicated by information associated with the accessed frame and the actual prediction identifying zero or more frames of the video comprises a queuing order of frames corresponding to the accessed frame.

* * * * *

UNITED STATES PATENT AND TRADEMARK OFFICE
CERTIFICATE OF CORRECTION

| | | |
|---|---|---|
| PATENT NO. | : 7,912,349 B1 | Page 1 of 1 |
| APPLICATION NO. | : 11/113362 | |
| DATED | : March 22, 2011 | |
| INVENTOR(S) | : John Samuel Bushell et al. | |

It is certified that error appears in the above-identified patent and that said Letters Patent is hereby corrected as shown below:

In column 4, line 19-41, delete "we now describe............with correct dependencies" and insert the same on Col. 4, Line 20 as a new paragraph.

In column 4, line 47-50, delete "The video playback...........display module 130." and insert the same on Col. 4, Line 46, after "112." as a continuation of the paragraph.

In column 18, line 30, delete "validated" and insert -- validated. --, therefor.

In column 26, line 38, in claim 16, after "with" insert -- the --.

In column 26, line 49, in claim 18, delete "prediction" and insert -- predictions --, therefor.

In column 26, line 54, in claim 19, delete "indicate" and insert -- indicates --, therefor.

In column 27, line 14, in claim 25, delete "frame" and insert -- frames --, therefor.

In column 27, line 15, in claim 25, delete "frame" and insert -- frames --, therefor.

In column 27, line 51, in claim 29, before "and" delete "first".

Signed and Sealed this
Twenty-second Day of November, 2011

David J. Kappos
*Director of the United States Patent and Trademark Office*